May 19, 1953 F. T. TURNER 2,639,321

FACSIMILE KEYING CIRCUIT

Filed Jan. 18, 1951

INVENTOR
F. T. TURNER

BY

[signature]

ATTORNEY

Patented May 19, 1953 2,639,321

UNITED STATES PATENT OFFICE 2,639,321

FACSIMILE KEYING CIRCUIT

Frank T. Turner, Hampton Bays, N. Y., assignor to The Western Union Telegraph Company, New York, N. Y., a corporation of New York Application January 18, 1951, Serial No. 206,644

10 Claims. (Cl. 178—5)

Figure 1:
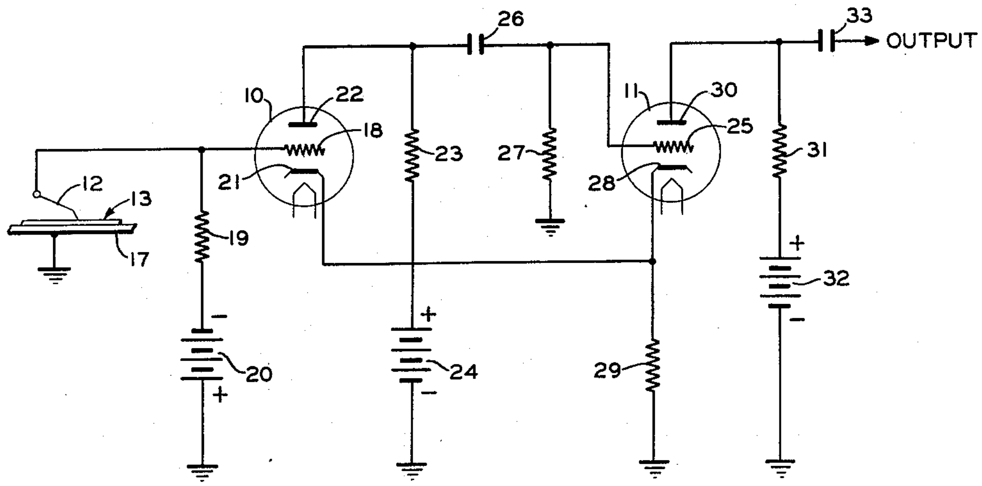

The present invention relates to telegraphic communication by facsimile transmission and more particularly to facsimile transmission using an electric stylus for scanning a sheet of paper or like material having marked and unmarked areas offering different resistances in the stylus circuit.

An oscillator keying circuit comprising an electric stylus for scanning paper or like material having marked and unmarked areas offering different resistances in the stylus circuit is characterized by simplicity of structure and ease of adjustment for producing facsimile signals.

In tuned circuit oscillators, the quality, or "Q," of the tuned circuit places an upper limit on the rate at which oscillations can build up or decay. This rate bears a relationship to the natural period of the tuned circuit, the natural period being a function of the circuit "Q." If, for instance, the oscillator were operated at a frequency suitable for radio transmission, the build-up and decay rate would be high compared to the facsimile keying rate, so the oscillator could faithfully follow the facsimile signal. However, when it is desired to generate a carrier frequency suitable for wire transmission, this frequency being, for instance, in the order of 1000 to 5000 cycles per second, the build-up and decay rate of the ordinary oscillator will be too close to the facsimile keying rate so that the oscillator can not faithfully follow the facsimile signal. In order to overcome this difficulty with an ordinary oscillator, recourse must be had to a bridge circuit or modulator. Such expedients will result in more complicated structure and will make adjustment of the circuit more difficult.

Accordingly, it is an object of the invention to provide a facsimile keying circuit suitable for use at relatively low frequencies and in which direct keying of a source of carrier signals may be employed.

More particularly, it is an object of the invention to provide a facsimile keying circuit suitable for use at relatively low frequencies and in which the stylus circuit resistance variations produced as the stylus scans marked and unmarked areas of paper or like material are used to key directly a source of carrier signals.

Further objects of the invention will appear from the following description.

According to the invention, these objects are achieved by providing a multivibrator circuit coupled to an electric stylus arranged to scan a marked paper and by providing means to prevent oscillations for one value of resistance provided by the paper in the stylus circuit and to cause oscillations for another value of resistance provided by the paper in the stylus circuit. It is to be understood that the term "paper," as used in the specification and claims, is to include not only paper as ordinarily understood, but any other kind of flexible sheet-like material capable of receiving a record and suitable for scanning in facsimile apparatus.

Figure 2:
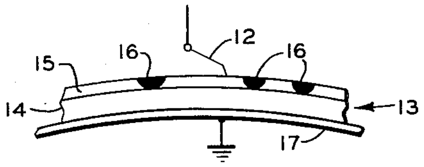

The invention will now be described in greater detail with reference to the appended drawing in which:

Fig. 1 is a circuit diagram of a facsimile transmission system embodying the invention; and Fig. 2 illustrates a copy sheet having conducting marks made on an insulating surface, this view being in exaggerated diagrammatic form for clearness.

Referring now to the drawing and more particularly to Fig. 1, there is shown the basic elements of a facsimile transmission system embodying the invention and comprising two electron discharge tubes 10 and 11 connected together in multivibrator circuit arrangement and a stylus 12 arranged to scan a copy sheet 13.

As shown in Fig. 2, copy sheet 13 consists of a conducting base 14, which may be composed of a material such as carbon impregnated paper, and a top coating 15 of a porous insulating material capable of being easily penetrated by the point of a conductive pencil. The marks 16 made by a soft pencil of graphite will penetrate through the coating 15 either by removing the material or filling the pores thereof. The marks 16 made by a pencil will be in good contact with conducting base 14 and a back contact 17 arranged to press on conducting base 14. Similar copy may be prepared by typewriting or writing on graphite coated transfer paper as disclosed in copending U. S. patent application Serial No. 62,184, filed November 26, 1948.

As stylus 12 scans copy sheet 13, the scanning resistance of the stylus circuit, which may be considered as the resistance between stylus 12 and back contact 17, has two values. One of these values is the relatively small or negligible resistance encountered while stylus 12 is resting on marks 16. The other value is the high resistance encountered while stylus 12 is resting on top coating 15. The invention is also applicable to transmission from a copy sheet having insulating characters on a conductive background as disclosed in copending U. S. patent application Serial No. 5,568, filed January 31, 1943. When using this latter type of copy sheet it is advisable to apply the output of the multivibrator to a signal inverter.

Referring again to Fig. 1, a control grid 18 of tube 10 is coupled to ground through a resistance 19 and a source of negative bias potential 20. Control grid 18 is also coupled to ground through stylus 12 and back contact 17. Back contact 17 preferably constitutes the grounded metal cylinder on which the copy sheet is mounted for scanning by the stylus.

When stylus 12 is resting on top coating 15, the resistance of the stylus circuit is very high so that the full negative potential of source 20 is applied to grid 19 to cut off tube 10.

When stylus 12 is resting on a mark 16, the resistance of the stylus circuit is very low, so that grid 18 is, for practical purposes, placed at ground potential. As a result, tube 10 will start to conduct.

An anode 22 of tube 10 is coupled to ground through an anode resistor 23 and a source of positive potential 24. Anode 22 is also coupled to a control grid 25 of tube 11 through a capacitor 26. Grid 25 is coupled to ground through a resistor 27. Cathode 28 of tube 11 is connected to the cathode 21 of tube 10. Both cathodes 21 and 28 are coupled to ground through a cathode follower resistor 29. An anode 30 of tube 11 is coupled to ground through an anode resistor 31 and a source of positive potential 32. The output of the circuit arrangement is derived from anode 30 through a capacitor 33.

In the quiescent condition of the multivibrator circuit, corersponding to the periods when stylus 12 is resting on top coating 15, tube 10 will be cut off by the bias voltage from source 20 while tube 11 will be conducting. When stylus 12 rests on a mark 16, grid 18 will be placed effectively at ground potential and the grid-cathode voltage of tube 10 will be substantially the bias voltage developed across resistor 29 by the anode current of the tube 11 flowing therethrough. Tube 10 will therefore start to conduct and a multivibrator switching action will occur as follows.

The flow of current in tube 10 will cause the anode to ground potential of tube 10 to decrease sharply. This decrease in potential will be repeated at grid 25 of tube 11 because of the coupling of anode 22 to grid 25 through capacitor 26. Since tube 11 is connected as a cathode follower, the cathode to ground potential thereof will also drop, but by an amount less than the drop in grid to ground voltage. The drop in voltage across cathode resistor 29 decreases the bias of tube 10, thereby tending to increase the current flow in tube 10. Increase in current flow of tube 10 will further decrease the anode to ground potential of tube 10 thereby aiding in cutting off tube 11. Once cut off, tube 11 remains cut off until the charge developed across capacitor 26 leaks off sufficiently to raise grid 25 above the cut off potential of tube 11, thereby allowing tube 11 to conduct. At this time a reverse switching operation occurs, the current in tube 11 raising the cathode voltage enough to cut off tube 10, the increase in anode voltage of tube 10 resulting from the decrease in current therethrough aiding in rendering tube 11 conductive. As soon as tube 11 becomes fully conductive, another switching action occurs, rendering tube 10 conductive and tube 11 nonconductive. These switching actions will continue at a frequency determined by the circuit constants, and in particular the discharging time constant of capacitor 26, until stylus 12 rests on top of insulating coating 15. When this occurs the grid to ground potential of tube 10 will again be determined by source 20 and tube 10 will remain cut off, preventing further switching operations. Since tube 11 is not biased to cut off, when source 20 cuts off tube 10, the circuit will always return to its quiescent condition with tube 10 cut off and tube 11 conducting.

The output voltage is derived from anode 30 and will have a generally rectangular waveform determined by the anode voltage variations of tube 11. The output voltage could, of course, be derived from other points in the multivibrator circuit, such as, for instance, anode 22 or grid 25. The output voltage may be sent out directly on the line or used to control additional apparatus.

Copy sheet 13 has been described as providing very high and very low values of resistance. However, it is not necessary that these resistance values be widely separated as it is only necessary that with one value of resistance the multivibrator will be cut off and with the other it will oscillate.

While the invention has been described in a particular form thereof and in a particular embodiment, it is not desired that it be limited thereto for obvious modifications thereof will occur to those skilled in the art without departing from the spirit and scope of the invention as set forth in the appended claims.

What is claimed is:

1. Facsimile transmission apparatus, comprising an electric stylus for scanning a transmitting blank having the subject matter to be transmitted delineated thereon by marking areas having a resistance substantially different from the remaining areas of said blank, a free-running multivibrator comprising first and second electron discharge tubes each having cathode, control grid and anode electrodes, means to interconnect said cathodes, an impedance element intercoupling said cathodes and ground potential and capacitive means intercoupling the anode of said first tube and the control grid of said second tube, means to suppress oscillations in said multivibrator circuit comprising biasing means coupled to the control grid of said first tube to prevent current flow in said first tube, means to produce oscillations in said multivibrator circuit while said electric stylus scans one of said areas comprising means to reduce the bias on the control grid of said first tube, said latter means including a series circuit arrangement intercoupling the control grid of said first tube and ground potential and comprising said electric stylus and said one area, and means coupled to said multivibrator circuit to derive therefrom an output signal while said electric stylus scans said one area.

2. Facsimile transmission apparatus, comprising an electric stylus for scanning a transmitting blank which has relatively conductive and nonconductive areas for delineating thereon the subject matter to be transmitted, a free-running multivibrator comprising first and second electron discharge tubes each having cathode, control grid and anode electrodes, means to interconnect said cathodes, an impedance element intercoupling said cathodes and ground potential and capacitative means intercoupling the anode of said first tube and the control grid of said second tube, means to suppress oscillations in said multivibrator circuit comprising biasing means coupled to the control grid of said first tube to prevent current flow in said first tube, means to produce oscillations in said multivibrator circuit while said electric stylus scans said conductive areas comprising means to reduce the bias on the control grid of said first tube, said latter means including a series circuit arrangement intercoupling the control grid of said first tube and ground potential and comprising said electric stylus and said conductive areas, and means coupled to said multivibrator circuit to derive therefrom an output signal while said electric stylus scans said conductive areas.

3. Facsimile transmission apparatus, comprising an electric stylus for scanning a transmitting blank which has relatively conductive and non-conductive areas for delineating thereon the subject matter to be transmitted, a free-running multivibrator comprising first and second electron discharge tubes each having cathode, control grid and anode electrodes, means to interconnect said cathodes, an impedance element intercoupling said cathodes and ground potential and capacitative means intercoupling the anode of said first tube and the control grid of said second tube, means to suppress oscillations in said multivibrator circuit comprising a source of negative biasing potential coupled to the control grid of said first tube to prevent current flow in said first tube, means to produce oscillations in said multivibrator circuit while said electric stylus scans said conductive areas comprising means to reduce the bias on the control grid of said first tube, said latter means including a series circuit arrangement intercoupling the control grid of said first tube and ground potential and comprising said electric stylus and said conductive areas, and means coupled to said multivibrator circuit to derive therefrom an output signal while said electric stylus scans said conductive areas.

4. Facsimile transmission apparatus, comprising an electric stylus for scanning a sheet of paper having a conducting base and an insulating upper surface marked with conducting characters which penetrate substantially to said base, a free-running multivibrator comprising first and second electron discharge tubes each having cathode, control grid and anode electrodes, means to interconnect said cathodes, a resistance element intercoupling said cathodes and ground potential and a capacitive element intercoupling the anode of said first tube and the control grid of said second tube, means to suppress oscillations in said multivibrator circuit comprising a source of negative biasing potential intercoupling the control grid of said first tube and ground potential to prevent current flow in said first tube, means to produce oscillations in said multivibrator circuit while said electric stylus scans said conducting characters comprising means to place the control grid of said first tube substantially at ground potential, said latter means including a series circuit arrangement intercoupling the control grid of said first tube and ground potential and comprising said electric stylus, said conducting characters and said conducting base, and means coupled to the anode of said second tube to derive therefrom an output signal while said electric stylus scans said conducting characters.

5. Facsimile transmission apparatus, comprising an electric stylus for scanning a transmitting blank which has relatively conductive and non-conductive areas for delineating thereon the subject matter to be transmitted, a free-running multivibrator comprising first and second electron discharge systems each having a cathode element, a control grid and an anode, means to interconnect said cathode elements, an impedance element intercoupling said cathode elements and ground potential and capacitative means intercoupling the anode of said first discharge system and the control grid of said second discharge system, means to suppress oscillations in said multivibrator circuit comprising biasing means coupled to the control grid of said first discharge system to prevent current flow in said first discharge system, means to produce oscillations in said multivibrator circuit while said electric stylus scans said conducting areas comprising means to reduce the bias on the control grid of said first discharge system, said latter means including a series circuit arrangement intercoupling the control grid of said first discharge system and ground potential and comprising said electric stylus and said conductive areas, and means coupled to said multivibrator circuit to derive therefrom an output signal while said electric stylus scans said conductive areas.

6. Facsimile transmission apparatus, comprising an electric stylus for scanning a sheet of paper having marked and unmarked areas having respectively different values of electrical resistance, a multivibrator circuit coupled to said electric stylus and having a quiescent condition and an oscillating condition, means to produce said quiescent condition of said multivibrator circuit while said electric stylus scans said areas having one value of electrical resistance, means including said electric stylus to produce said oscillating condition of said multivibrator circuit while said electric stylus scans the areas having said different value of electric resistance, and means to derive an output signal from said multivibrator circuit during said oscillating condition thereof.

7. Facsimile transmission apparatus, comprising an electric stylus for scanning a sheet of paper having marked areas of low electrical resistance and unmarked areas of high electrical resistance, a free-running multivibrator circuit coupled to said electric stylus and having a quiescent condition and an oscillating condition, means to produce said quiescent condition of said multivibrator circuit while said electric stylus scans said unmarked areas, means including said electric stylus to produce said oscillating condition of said multivibrator circuit while said electric stylus scans said marked areas, and means to derive an output signal from said multivibrator circuit during said oscillating condition thereof.

8. Facsimile transmission apparatus, comprising an electric stylus for scanning a transmitting blank having the subject matter to be transmitted delineated thereon by marking areas having a resistance different from the remaining areas of said blank, multivibrator circuit coupled to said electric stylus and having a quiescent condition and an oscillating condition, means for producing said quiescent condition of said multivibrator circuit while said electric stylus scans one of said areas, means including said electric stylus for producing said oscillating condition of said multivibrator circuit while said electric stylus scans the other of said areas, and means to derive an output signal from said multivibrator circuit during said oscillating condition thereof.

9. Facsimile transmission apparatus, comprising an electric stylus for scanning a transmitting blank which has relatively conductive and non-conductive areas for delineating thereon the subject matter to be transmitted, a free-running multivibrator circuit coupled to said electric stylus and having a quiescent condition and an oscillating condition, means for producing said quiescent condition of said multivibrator circuit while said electric stylus scans said non-conductive areas, means including said electric stylus for producing said oscillating condition of said multivibrator circuit while said electric stylus scans said conductive areas, and means to derive an output signal from said multivibrator circuit during said oscillating condition thereof.

10. Facsimile transmission apparatus, comprising an electric stylus for scanning a transmitting blank which has relatively conductive and non-conductive areas for delineating thereon the subject matter to be transmitted, a multivibrator circuit coupled to said electric stylus and having a quiescent condition and an oscillating condition, biasing means coupled to said multivibrator circuit for producing said quiescent condition of said multivibrator circuit while said electric stylus scans one of said areas, means for producing said oscillating condition of said multivibrator circuit while said electric stylus scans the other of said areas, said latter means comprising a series circuit arrangement for substantially short-circuiting said biasing means and including said electric stylus and said other of said areas, and means to derive an output signal from said multivibrator circuit during said oscillating condition thereof.

FRANK T. TURNER.

References Cited in the file of this patent

UNITED STATES PATENTS

| Number | Name | Date |
|---|---|---|
| 2,143,875 | Hansell | Jan. 17, 1939 |
| 2,277,261 | Smith | Mar. 24, 1943 |
| 2,511,093 | Atwood | June 13, 1950 |
| 2,539,797 | Smith | Jan. 30, 1951 |